July 22, 1952   D. F. GENTZ   2,603,877
TELESCOPING TYPE MEASURING RULE
Filed Nov. 22, 1947   2 SHEETS—SHEET 1
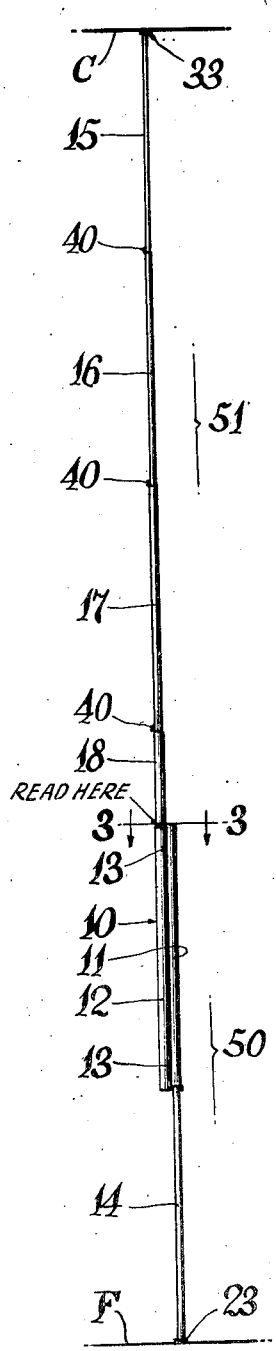
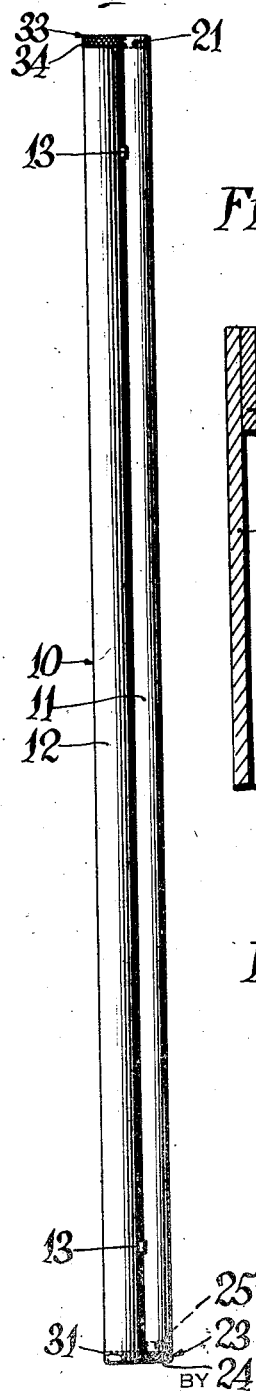
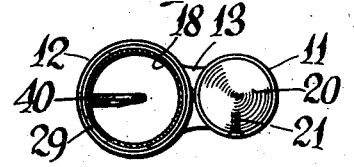
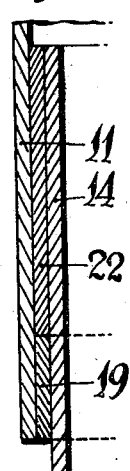
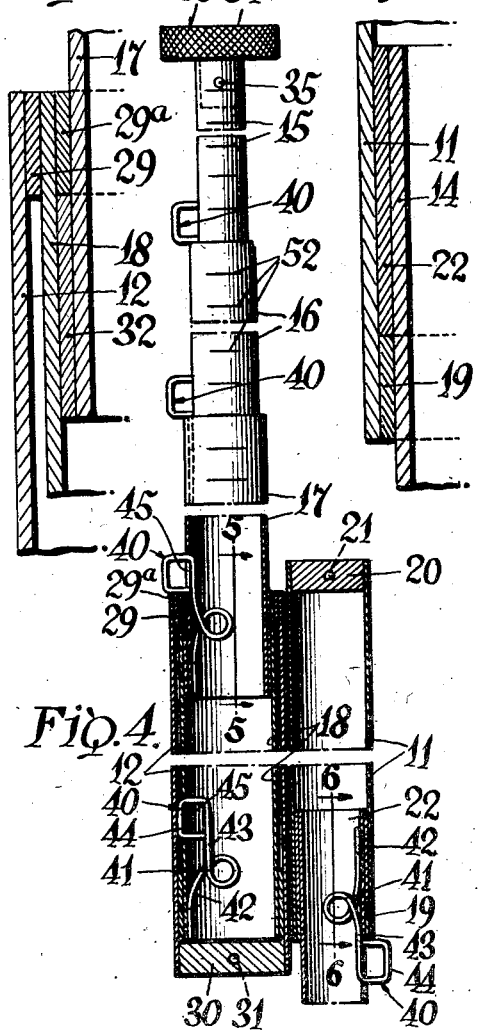
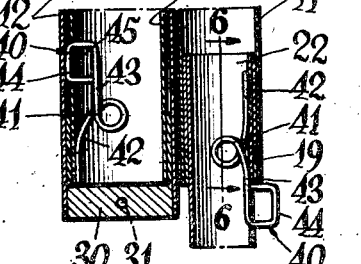
INVENTOR.
Donald F. Gentz,
BY
ATTORNEY July 22, 1952     D. F. GENTZ     2,603,877
TELESCOPING TYPE MEASURING RULE
Filed Nov. 22, 1947     2 SHEETS—SHEET 2
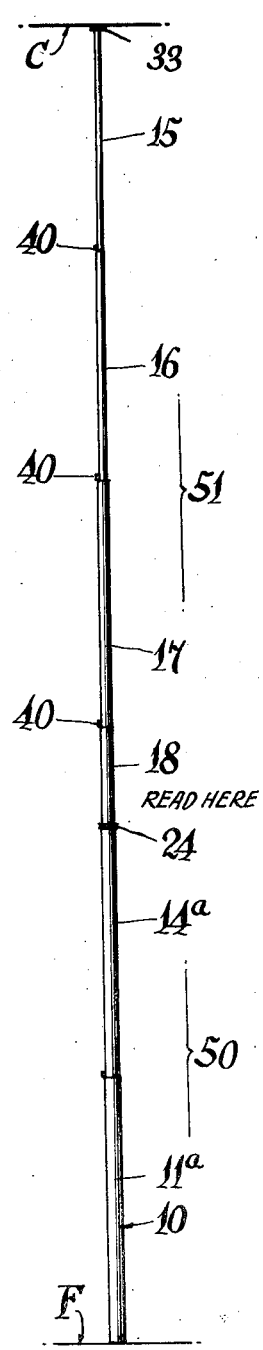
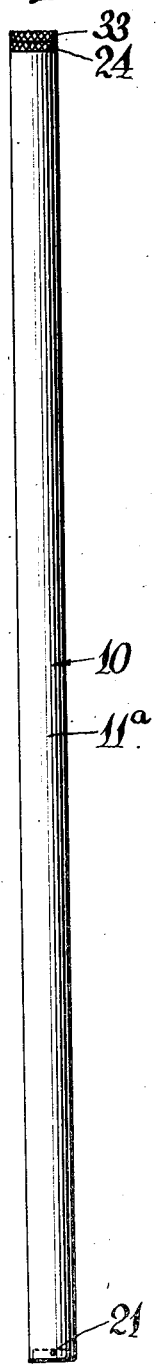
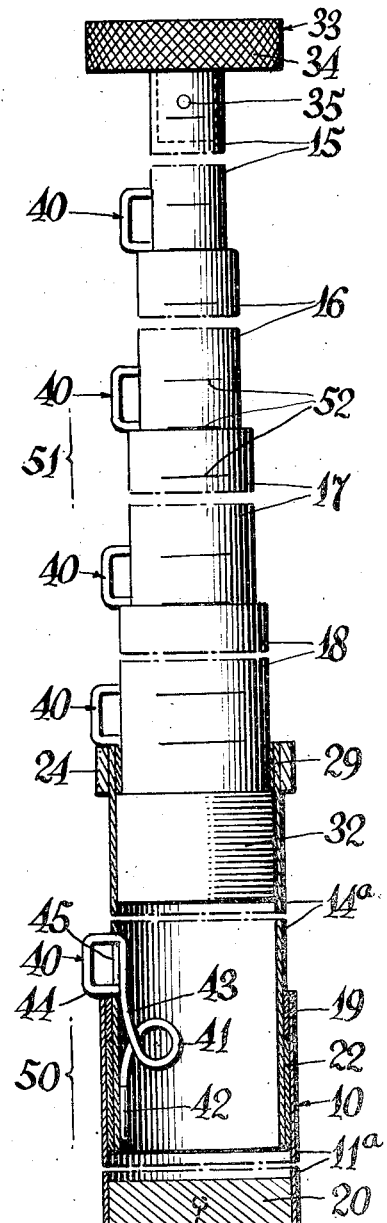
INVENTOR.
Donald F. Gentz,
BY
ATTORNEY Patented July 22, 1952

2,603,877

UNITED STATES PATENT OFFICE 2,603,877

TELESCOPING TYPE MEASURING RULE

Donald F. Gentz, Buffalo, N. Y.; Robert Smolka, trustee of said Donald F. Gentz, assignor to Henrich Lumber Inc., Buffalo, N. Y., a corporation of New York Application November 22, 1947, Serial No. 787,575

4 Claims. (Cl. 33—161)

1

This invention relates to telescoping type measuring rules.

In prior practice such rules have lacked provision for the immediate and accurate reading of a measurement indication of the remote point of reference as it may be beyond the normal range of vision of the user and, therefore, their use has been attended by the disadvantages of inconvenience in the effort to achieve accuracy in the reading of the total measurement, the loss of time in the same effort and a substantial liability of error in the determination of the measurement.

The object of the invention is to provide a telescoping type measuring rule which, regardless of the number of its sections or the extent of the rule when the sections are in extended relation, will enable immediacy of the accurate reading of total measurement of dimensions in which a measurement indication at the remote point of reference would be beyond the normal range of vision of the user, and at the same time will satisfy the requirements of compactness when the sections are in telescopic relation and of rigidity when any, or all, of the sections are in extended relation.

In the drawings:

Figure 1 is a side elevation of a telescopic rule in accordance with the invention, its sections being shown as extended to measure a vertical dimension having an upper limit beyond the reach of the user.

Figure 2 is a side elevation of the rule with the sections telescoped.

Figure 3 is a horizontal cross section in the plane 3—3 of Figure 1, looking in the direction of the arrows.

Figure 4 is a view partly in side elevation and partly in central longitudinal section, the rule sections being shown as extended.

Figure 5 is a fragmentary vertical sectional view on an enlarged scale on the line 5—5 of Figure 4.

Figure 6 is a fragmentary vertical sectional view on an enlarged scale on the line 6—6 of Figure 4.

Figure 7 is a side elevation of a modified construction, the rule sections being shown as extended.

Figure 8 is a side elevation of the modified form with the rule sections in telescoped relation.

Figure 9 is a view of the modified construction, partly in side elevation and partly in central longitudinal section, the rule sections being shown as extended.

The rule includes a supporting stand composed of extensible and collapsible elements and a measuring leg composed of telescopically related elements. The elements of the stand as extended are stably maintained in alinement. The element of the stand which is its upper element when the stand is extended provides a receiver which is in immediate telescopic relation to an adjacent element of the measuring leg. The elements of the measuring leg are graduated in diameter whereby each may telescope into a contiguous element, an element of lesser diameter, preferably somewhat shorter in length than a contiguous element of greater diameter, being in telescopic relation to the contiguous element of greater diameter. The measuring leg is shown as having four elements (later severally described in detail) which are designated as 15, 16, 17 and 18. The maximum dimensions of the rule with its elements fully extended may obviously be varied according to the manufacturer's choice. The maximum dimension of fourteen feet has been found to accord with the usual range of measurements in the various environments in which the rule may be used.

The construction is preferably such that with the sections of the stand and the measuring leg completely telescoped the length of the rule will not exceed the length of the section which provides the receiver. Thus if the receiver be substantially two and one-half feet in length the length of the rule when the sections are completely telescoped will be substantially two and one-half feet. Thus the advantage of compactness is achieved and the rule, being light in weight, may be conveniently carried from place to place. The stand, with its sections extended, has a predetermined height known to the user, e. g. five feet, such that the measurement will be read, in accordance with the invention, at a point immediately adjacent the upper end of the stand and at approximate eye level or within easy eye range and will be indicated and read at its accurate value in excess of five feet which is herein assumed as the height of the stand. In this way the rule achieves the advantages of convenience, immediacy and accuracy in the reading of the measurement.

In the embodiments shown the stand consists of telescopically related elements assembled for extension and collapse and which, as extended, are in upper and lower relation, the element in the lower relation bearing upon the floor or other appropriate base which constitutes a point of reference and the element in the upper relation providing the tubular receiver for cooperation with the measuring leg, one of the elements of the measuring leg having an immediate telescopic fit in the receiver.

Referring to Figures 1 to 6:

The stand 50 comprises the parts 11, 12 and 14. The part 12 is the tubular receiver for cooperation with the measuring leg. The part 11 is a tubular part in telescopic relation to the part 14 which is downwardly extensible. The parts 11 and 12 constitute the upper element of the stand (when the stand elements are extended) and are joined by welds 13 at points near their end. The section 14 engages the floor F as a supporting base.

The measuring leg includes tubular telescopically related elements which, in the order of their diametrical extent, are designated 15, 16, 17 and 18, the section 15 being of smallest diameter and the sections 16, 17 and 18 being of progressively greater diameters. The section 15 telescopes into the section 16; the section 16 into the section 17; the section 17 into the section 18; and the section 18 into the element 12 of the section 10. Thus, as shown in Figure 2, all of the sections 15, 16, 17 and 18 when completely telescoped are enclosed in the element 12 and the section 14, when telescoped, is enclosed in the element 11.

The elements 11 and 12 are preferably longitudinally offset to a slight extent whereby the element 11 projects at its upper end beyond the element 12 and the element 12 projects at its lower end beyond the element 11. The element 11, which is preferably of less diameter than the element 12, is provided at its lower end with an internally arranged stop ring 19, the lower edge face of which is flush with the lower edge face of the element 11. The element 11 is also provided at its upper end with a closure plug 20, flush with the upper edge face of the element. The ring 19 and the plug 20 are rigidly secured to the element 11, the ring being secured by welding and the plug by a cross pin 21.

The section 14, tubular for the sake of lightness, is slidably fitted within the ring 19 and at its inner end is provided with an enlargement, conveniently in the form of a ring 22, secured to the element by welding. The outer end of the section 14 is closed by a plug 23 which may be secured by a cross pin 25. The head 24 of the plug 23 projects beyond the section 14 and is diametrically co-extensive with the external diameter of the section 11. When the section 14 is telescoped the head 24 limits its inward movement, for this purpose engaging the lower end of the element 11. The section 14 may be projected from the element 11 by grasping the head 24 (which is preferably knurled) and pushing the section outward to the limit of its movement while holding the section 10 with the other hand.

The element 12 is provided at its upper end with an internal stop ring 29, having its upper edge face flush with the upper edge face of the element and at its lower end with a closure plug 30 flush with the end face of the head 24 in the telescoped relation of the section 14. The ring 29 and the plug 30 are rigidly secured, the ring by welding and the plug by a cross pin 31.

Each of the tubular sections 18, 17 and 16 is provided at its outer end with an internal stop ring 29a (shown in Figure 4 in the instance of the section 18). The sections 15, 16, 17 and 18 are severally slidably mounted in the stop rings of the contiguous sections of greater diameter, respectively the sections 16, 17 and 18 and the element 12 of the section 10. Each section 15, 16, 17 and 18 is provided at its inner end with a lifting ring 32 which engages the stop ring 29a of the contiguous section of greater diameter. Each stop ring has a close fit upon the external surface of the contiguous section of lesser diameter and each lifting ring has a close fit relatively to the internal surface of the contiguous section of greater diameter.

The section 15 carries at its outer end a closure plug 33 similar in form to the plug 23 and which has a projecting knurled head 34 and is secured by a cross pin 35. The head 34 is preferably diametrically co-extensive with the external diameter of the element 12 and provides a fingerpiece which may be grasped when the section 15 is to be extended. When the sections are completely telescoped within the element 12 the head 34 abuts the end of the element 12 and thus limits the inward telescoping movement of the sections 15, 16, 17 and 18. When the sections are completely telescoped the outer face of the head 34 is flush with the face of the plug 20 at the upper end of the element 11.

While the fit between the several sections and the stop rings and lifting rings is such that the sections are frictionally held in any extended positions a positive latch 40 is preferably provided at the inner end of each slidable section, the latch 40 in the fully extended relation of the section by which it is carried automatically engaging over the outer end of the contiguous section of greater diameter and thus positively preventing relative movement of the contiguous sections. Each latch 40 is preferably in the form of a torsion spring wire having a central helical loop 41 between its oppositely extending arms 42 and 43. The arm 42 serves for the attachment of the latch and is secured, preferably by welding, at the inner end of the section by which the latch is carried. The arm 43 is provided with a terminal latching projection 44, preferably in the form of a radially extending loop of rectangular outline. Each of the sections 15, 16, 17 and 18 is provided with a slot 45 through which the loop 44 projects. In any position of a section short of its fully extended position the loop 44 bears with strong frictional pressure against the inner wall of the surrounding section, the degree of pressure, supplementing the fit of the sections relatively to the stop rings and the lifting rings as above described, being such that the sections will be stably maintained in any positions of relative extension. When a section is fully extended the loop 44 snaps over the outer end of the surrounding section and positively prevents relative movement of the contiguous sections. By pressing the loop 44 inward until it is flush with the outer surface of the extended section by which it is carried, such section may be moved telescopically into the surrounding section.

The element 11 and the section 14 in fully extended relation provide the supporting stand 50, this stand constituting a rigid measuring leg having a fixed and known length whereby its upper end is at eye level or within easy eye range of an individual of normal stature, e. g. a length of five feet. In taking measurements the supporting stand is held in one hand, the knurled head 24 of the section 14 is grasped by the other hand and the section 14 is fully extended from the element 11, the latch 40 rigidly maintaining the section 14 in extended relation.

The sections 15, 16, 17 and 18 comprise a telescoping measuring leg 51 of variable length which is extensible beyond the fixed leg. The sections 15, 16, 17 and 18 are each provided with a series of numbered calibrations 52 and are successively extensible in the order named, their extension exposing the calibrations to view. The calibration indicative of the lowest measurement value is at the outer or upper end of the section 15 which is the first section to be withdrawn from the receiver. The value indicated by the calibrations increases in order from the upper end of the section 15 to its lower end and similarly, the calibrations being serially continued, their indicated value increases in like order from the upper end of each section of the measuring leg to its lower end. The graduations are in feet, inches and suitable fractions of inches, and the calibrations are read at a point immediately adjacent the upper end of the stand 50. Thus, if the section 15 be withdrawn (the first section of the measuring leg to be withdrawn) one foot from the receiver 12, the other sections remaining completely enclosed, the calibration which is marked to indicate six feet (the height of the stand 50 being five feet) appears immediately above the upper end of the receiver 12. As the upward extension movement of the section 15 is continued the value indicated by the calibrations increases and the calibration indicative of measurement value, in accordance with the degree of extension or projection of the section 15, will appear immediately above the upper end of the receiver 12. If the total measurement to be taken should exceed the measurement indicated by the full extension of the section 15 relatively to the receiver 12, the upward movement of the section 15 is continued, and the section 15 in its further upward movement will carry with it the section 16 in which case, in like manner, the measurement value, now shown by the section 16, will be read immediately above the upper end of the receiver 12. After the section 16 has been lifted to a suitable extent it may be grasped by the hand to effect such further extension as may be necessary. If the measurement to be taken should exceed the measurement indicated by the full extension of the section 16 relatively to the section 17 the upward movement of the section 16 is continued, thereby to cause it to lift the section 17. In like manner the section 17 may be lifted by the hand and its upward movement continued to a point at which it lifts the section 18. Since the calibrations have the serial arrangement above explained all measurements are conveniently and accurately readable at a fixed point of the rule which is determined by the location of the upper end of the receiver 12 and is substantially at eye level or within easy eye range. The measurement value of the calibrations, as read at the eye level of the stand 50 is in ascending scale, that is to say, the lowest value is first exposed to view at the upper end of the section 15 and the higher values are progressively exposed to view as the section 15 and any of the following sections may be moved upward in extended relation.

As an example of use, let it be assumed that the rule has a measuring capacity of fourteen feet and that the dimension to be measured is twelve feet, nine inches, the distance vertically between the floor F and a ceiling C. With the leg 50 supported upon the floor F and grasped by one hand the section 15 is grasped by the other hand and fully extended beyond and relatively to the element 12, the other sections remaining immobile within the element 12; when the section 15 is fully extended the loop 44 of its latch 40 engages over the upper end of the section 16 (such upper end being flush with the upper end of the element 12); the extension of the section 15 in this manner is continued, thereby (by the engagement of its lifting ring 32 with the stop ring 29a of the section 16) to cause it to pull the section 16 beyond the element 12 to an elevation at which the section 16 may be grasped and similarly manipulated; the extension movement of the section 16 is in like manner continued to effect the partial extension of the section 17; and the extension movement of the section 17 is in like manner continued to effect the partial extension of the section 18. By proceeding in this manner the head 34 of the section 15 is ultimately brought into contacting engagement with the ceiling C and the further extension of the rule is thereby arrested. The sections 15, 16 and 17 will be held rigidly in extended relation by the latches 40 and the section 18 (in the example assumed) will be held securely in partially extended relation by the frictional engagement of the loop 44 of its latch 40 against the inner circumferential face of the element 12. With the sections 15, 16, 17 and 18 thus extended the reading on the section 18 at a point adjacent the upper end of the stand 50 will be twelve feet, nine inches.

In like manner any reading within the capacity of the rule may be taken, it being obvious that the number of sections which are extended and the degree of their extension depends on the particular dimension to be measured. Thus for measurements of minimum extent beyond five feet it may be necessary to extend only the section 15; other dimensions may require the extension of sections 15 and 16, the latter being extended wholly or partially; in like manner other dimensions may require the additional extension of the section 17 and the extension, wholly or partially (as in the example assumed) of the section 18. In all cases the section of greater diameter contiguous to the section which is being grasped and manipulated will remain within the element 12 until the extension of the grasped section is continued beyond the element 12 at which time the contiguous section of greater diameter will be pulled from the element 12 to an extent corresponding to the continued extension of the grasped element.

The measurement having been taken, the sections of the leg 51 are restored to completely telescoped relation by pushing the section 18 to its limit within the element 12, depressing the latch 40 of the section 17 and pushing the section to its limit within the section 18, and similarly successively telescoping the sections 16 and 15, the head 34 of the section 15 at such time engaging the upper or outer end of the element 12. The leg 50 is similarly telescoped, that is to say, the latch 40 of the section 14 is depressed and the section 14 is pushed inward to its limit within element 11, its head 24 at such time engaging the lower end of the element 11.

In the modified construction shown in Figures 7, 8 and 9 the stand 50 comprises the tubular telescopically related elements 11a and 14a. The element 11a engages the floor or base which serves as a point of reference. The element 14a is the tubular receiver and has a telescopic fit within the element 11a. The measuring leg consists of the sections or elements 15, 16, 17 and 18 as above described and the element 18 of the measuring leg has an immediate telescopic fit within the receiver 14a in the same manner that, in the embodiment of Figure 1, it has an immediate telescopic fit within the receiver 12. The section 14a is upwardly extensible from the section 11a. The outer open end of the section 11a is provided with a stop ring 19 in which the section 14a is slidably fitted. A collar 22 is secured externally at the inner end of the section 14a and has a slidable fit in the bore of the section 11a, the abutting engagement of the collar 22 with the ring 19 limiting the extension of the section 14a. The lower end of the section 11a is closed by a plug 20 which may be secured by a cross pin 21. The section 14a is provided at its upper or outer end with an external knurled collar 24 which is diametrically co-extensive with the external diameter of the section 11a and by means of which the section 14a may be conveniently projected from the section 11a in setting up the stand 50, the collar 24 by engagement with the upper end of the section 11a limiting the movement of the section 14a into the section 11a.

The section 14a, now bearing the same relation to the extensible leg 51, as the element 12 in the embodiment shown in Figures 1 to 6, is provided at its upper end with an enclosed stop ring 29 in which the section 18 is slidably fitted. The sections 15, 16, 17 and 18 are each provided at their lower ends with external lifting rings 32 (shown in the instance of the section 18) which cooperate with internally fitted stop rings at the upper ends of the contiguous sections of greater diameter. The construction shown in Figures 7, 8 and 9 is used in the same manner as the construction shown in Figures 1 to 6, the stand 50 of pre-determined length, e. g., five feet, being first set up and the measurement taken by extending the sections in such succession as may be required, the section 15 being first extended and, if necessary, the sections 16, 17 and 18 being extended in successive order. In collapsing the rule the latch 40 of the section 14a is depressed and the section 14a is pushed to its limit within the section 11a. The sections 15, 16, 17 and 18 are thereupon collapsed in the same manner as in the construction shown in Figures 1 to 6.

I claim:

1. A telescoping rule for measuring distances beyond the reach of the user comprising a stand composed of a pair of parallel, tubular elements secured together in side-by-side relation, an extensible member telescopically fitted in one of said tubular elements and movable to a fully extended position in which it is engageabe with a floor to support the upper end of the stand at a point at eye level or within easy eye range, a variably extensible measuring leg consisting of a series of tubular sections of graduated diameter, each section having a telescoping fit in a contiguous section of greater diameter and the section of greatest diameter having a telescoping fit in the other of said tubular elements, said sections decreasing in length in the order of the decrease in their diameters, whereby all of said sections as fully telescoped may be completely enclosed within the other of said tubular elements, internal stop rings carried at their outer ends by said sections and the tubular element in which said sections are accommodated, rings carried externally by the several sections at their inner ends and engageable with said internal rings, the external rings of the several sections cooperating with the internal rings as lifting rings with the exception of the external ring of the section which directly telescopes into the other of said tubular elements, the internal rings having a close fit relatively to the external surfaces of the contiguous sections of lesser diameter and the external rings having a close fit relatively to the external surfaces of the contiguous sections of greater diameter, and spring-pressed, manually-releasable latch elements for positively latching the several sections in their fully extended positions, the sections having measuring calibrations in ascending order from the outer end of the section of least diameter to the inner end of the section of greatest diameter, whereby the measurement in the extended relation of any or all of the sections is readable at the point of the upper end of said stand.

2. A telescoping rule for measuring distances beyond the reach of the user comprising a stand composed of a pair of parallel, tubular elements secured together in side-by-side relation, an extensible member telescopically fitted in one of said tubular elements, releasable latch means on said extensible member for positively latching said member in a fully extended position in which it is engageable with a floor to support the upper end of the stand at a point at eye level or within easy eye range, a variably extensible measuring leg consisting of a series of tubular sections of graduated diameter, each section having a telescoping fit in a contiguous section of greater diameter and the section of greatest diameter having a telescoping fit in the other of said tubular elements, internal stops carried at their outer ends by said sections and the tubular element in which said sections are accommodated, stops carried externally by the several sections at their inner ends and cooperating with said first mentioned stops as lifting elements with the exception of the external stop of the section which directly telescopes into the other of said tubular elements, and means for stably maintaining the several sections in any position within their range of extensibility, the sections having measuring calibrations in ascending order from the outer end of the section of least diameter to the inner end of the section of greatest diameter, whereby the measurement in the extended relation of any or all of the sections is readable at the point of the upper end of said stand.

3. A telescoping type rule for measuring distances beyond the reach of the user comprising a casing consisting of a pair of parallel tubular elements secured together in parallel, side-by-side relation and adapted to be held while being used so that one end of the casing will be located within easy eye range, a tubular member telescopically fitting within one of said tubular elements and extensible in one direction, a measuring leg variably extensible in the opposite direction consisting of a series of tubular sections of graduated diameter, each section having a telescoping fit in a contiguous section of greater diameter and the section of greatest diameter having a telescoping fit within the other of said tubular elements, and means for stably maintaining said sections in any position within their range of extensibility, the sections of said leg having measuring calibrations in ascending order from the outer end of the section of least diameter to the inner end of the section of greatest diameter, whereby the measurement in the extended relation of any or all of said sections is readable at the end of said casing within easy eye range.

4. A telescoping type measuring rule for measuring distances beyond the reach of the user comprising a supporting stand and a measuring leg; the stand consisting of companion elements assembled for extension and collapse and which, as extended, are in alinement in lower and upper relation, the element which is in the lower relation bearing upon the floor or other appropriate base which constitutes a point of reference and the element which is in the upper relation providing a tubular receiver for cooperation with the measuring leg, and means for stably holding the companion elements in fully extended relation, the stand, when its companion elements are fully extended having a known predetermined length such that the upper end of the element in upper relation is substantially at eye level or within easy eye range; the measuring leg consisting of a number of tubular elements of successively smaller diameter and which are telescopically assembled for extension and collapse, the element of the measuring leg of greatest diameter having an immediate telescopic fit within the receiver of the stand and being extensible and collapsible with reference to the receiver, and the other elements of the measuring leg in successive relation severally and similarly having a telescopic fit within a preceding element and being similarly extensible and collapsible with reference to the preceding elements the inner element of each pair of adjacent telescopically related elements having a fit within the outer element of the pair such that it is frictionally held in any relation of extension, the element of the measuring leg which is of least diameter being provided at its upper end with a head which in the fully collapsed relation of the elements of the measuring leg is beyond the receiver and adjacent its upper end, the head providing a finger piece which may be grasped when said element is to be extended, the elements of the measuring leg being provided with numbered calibrations which, in arithmetical progression, commence at the upper end of the element of the measuring leg of least diameter and proceed serially to the lower end of the element of the measuring leg of the greatest diameter the measuring leg exercising its function at any degree of the extension of one or more of its elements, the calibrations of the measuring leg being successively exposed for reading in ascending order at a point immediately adjacent the upper end of the stand in the progression of the upward extension of the elements of the measuring leg commencing with the element of least diameter and all readings of measurement, regardless of the length of the measuring leg or the degree of its extension, being taken at such point, the receiver and the measuring leg element of greatest diameter being provided with parts which cooperate as a means for limiting the extension movement of said element, the other elements of the measuring leg being provided with similar parts which cooperate as a means for limiting their extension movement relatively to the adjacent element of greater diameter and also as a means which, by a lifting action, effects the extension movement of the adjacent element of greater diameter.

DONALD F. GENTZ.

REFERENCES CITED

The following references are of record in the file of this patent:

UNITED STATES PATENTS

| Number | Name | Date |
|---|---|---|
| 287,021 | Gurley | Oct. 23, 1883 |
| 1,003,626 | Malcolm | Sept. 19, 1911 |
| 1,050,733 | Greathead | Jan. 14, 1913 |
| 1,299,627 | Simon | Apr. 8, 1919 |
| 1,754,334 | Quigley | Apr. 15, 1930 |
| 1,888,113 | Dougovito | Nov. 15, 1932 |
| 1,985,527 | Taylor | Dec. 25, 1934 |
| 2,232,824 | Maher | Feb. 25, 1941 |
| 2,356,544 | Swanson | Aug. 22, 1944 |
| 2,427,841 | Dichter | Sept. 23, 1947 |

FOREIGN PATENTS

| Number | Country | Date |
|---|---|---|
| 13,617 of 1903 | Great Britain | Apr. 21, 1904 |